United States Patent
Sorlander

(10) Patent No.: US 10,552,018 B2
(45) Date of Patent: Feb. 4, 2020

(54) METHODS AND SYSTEMS TO DISPLAY DATA RECORDS EXTRACTED FROM A DATABASE VIA A GRAPHICAL USER INTERFACE

(71) Applicant: VIGOR SYSTEMS INC., La Jolla, CA (US)

(72) Inventor: Magnus Sorlander, La Jolla, CA (US)

(73) Assignee: VIGOR SYSTEMS INC., La Jolla, CA (US)

(*) Notice: Subject to any disclaimer, the term of this patent is extended or adjusted under 35 U.S.C. 154(b) by 746 days.

(21) Appl. No.: 14/774,952

(22) PCT Filed: Mar. 17, 2014

(86) PCT No.: PCT/US2014/030405
§ 371 (c)(1),
(2) Date: Sep. 11, 2015

(87) PCT Pub. No.: WO2014/145610
PCT Pub. Date: Sep. 18, 2014

(65) Prior Publication Data
US 2016/0018975 A1    Jan. 21, 2016

Related U.S. Application Data

(60) Provisional application No. 61/788,182, filed on Mar. 15, 2013.

(51) Int. Cl.
*G06F 3/0484* (2013.01)
*G06F 16/903* (2019.01)
(Continued)

(52) U.S. Cl.
CPC ...... *G06F 3/04847* (2013.01); *G06F 3/04812* (2013.01); *G06F 3/04817* (2013.01); *G06F 16/2428* (2019.01); *G06F 16/903* (2019.01)

(58) Field of Classification Search
CPC ......... G06F 17/30398; G06F 17/30395; G06F 3/04847; G06F 3/04812; G06F 3/04817;
(Continued)

(56) References Cited

U.S. PATENT DOCUMENTS 5,787,411 A   7/1998   Groff et al.
6,239,797 B1  5/2001   Hills et al.
(Continued)

FOREIGN PATENT DOCUMENTS

EP   1643386 A2   4/2006
EP   1643386 A3   4/2006

OTHER PUBLICATIONS

Extended Search Report for European Patent Application No. 14762894.5, dated Oct. 5, 2016, 11 pages.
(Continued)

*Primary Examiner* — Andrew L Tank
(74) *Attorney, Agent, or Firm* — Sheridan Ross P.C.

(57) ABSTRACT

A system and method for managing display of database records are provided. The method includes determining whether a pointer is positioned over a data cell of a plurality of data cells of a graphical user interface; in response to receiving an actuation signal related to the pointer while the pointer is determined to be over the data cell, automatically modifying search criteria applied to database data according to the data of the data cell; and automatically outputting the database data filtered by the modified search criteria to the graphical user interface.

17 Claims, 12 Drawing Sheets

(51) Int. Cl.
*G06F 16/242* (2019.01)
*G06F 3/0481* (2013.01)

(58) Field of Classification Search
CPC .............. G06F 16/903; G06F 16/2424; G06F 16/2428; G06Q 10/06
See application file for complete search history.

(56) References Cited

U.S. PATENT DOCUMENTS

| | | | | |
|---|---|---|---|---|
| 6,738,770 | B2* | 5/2004 | Gorman | G06F 17/246 707/723 |
| 7,487,139 | B2* | 2/2009 | Fraleigh | G06F 17/245 |
| 7,519,585 | B2 | 4/2009 | Kenney et al. | |
| 7,627,812 | B2* | 12/2009 | Chamberlain | G06F 17/212 715/214 |
| 2009/0193352 | A1 | 7/2009 | Bunn | |
| 2009/0276691 | A1* | 11/2009 | Galuten | G06F 17/30011 715/217 |
| 2012/0167006 | A1 | 6/2012 | Tillert et al. | |
| 2013/0061161 | A1* | 3/2013 | Schwartz | G06Q 10/10 715/764 |
| 2014/0059069 | A1* | 2/2014 | Taft | G06F 17/30442 707/765 |
| 2014/0108899 | A1* | 4/2014 | Brissette | G06F 17/2235 715/205 |
| 2014/0215377 | A1* | 7/2014 | Vivi | G06F 3/0484 715/780 |

OTHER PUBLICATIONS

International Search Report and Written Opinion prepared by the United States Patent and Trademark Office dated Jul. 19, 2014, for International Application No. PCT/US2014/030405.
Search within a webpage (find bar). Help document [online]. Google, Inc., 2012 [retrieved on Sep. 11, 2015.] http://web.archive.org/web/20120503075218/http://support.google.com/chrome/bin/answer.pv?h1=en&answer=95635&&topic=14676&ctx=topic.

* cited by examiner

| Filter search criteria | | | |
|---|---|---|---|
| Data 2b | Data 3c | | |

| Parameter 2 | Parameter 3 | Parameter 4 | Parameter 1 |
|---|---|---|---|
| Data 2b | Data 3c | Data 3d | Date 2 |
| Data 2b | Data 3c | Data 4d | Date 3 |
| | | | |
| | | | |
| | | | |

Region for displaying filter search criteria

Data displayed from database

Data displayed from database after both filters have been activated

Figure 7

Record structure

| | Resistance | Composition | Tolerance | Power rating |
|---|---|---|---|---|
| Record 1 | 1000 | Carbon film | 10% | 0.5W |
| Record 2 | 2200 | Metal oxide | 1% | 0.3W |
| Record 3 | 1000 | Metal oxide | 5% | 1W |
| Record 4 | 1000 | Metal oxide | 5% | 3W |
| Record 5 | 2200 | Wire wound | 5% | 3W |

Data fields within a record structure

Figure 8

| Filter search criteria | | | |
|---|---|---|---|
| Metal oxide | 5% | | |

| Composition | Tolerance | Power rating | Resistance |
|---|---|---|---|
| Metal oxide | 5% | 1W | 1000 |
| Metal oxide | 5% | 3W | 1000 |
| | | | |
| | | | |
| | | | |

Region for displaying filter search criteria

Data displayed from database

Data displayed from database after filters activated

Figure 13

[ AND ]  [ OR ]

| Filter search criteria | | | |
|---|---|---|---|
| Metal oxide | 5% | | |

| Composition | Tolerance | Power rating | Resistance |
|---|---|---|---|
| Metal oxide | 1% | 0.3W | 2200 |
| Metal oxide | 5% | 1W | 1000 |
| Metal oxide | 5% | 3W | 1000 |
| Wire wound | 5% | 3W | 2200 |
| | | | |

Region for displaying filter search criteria

Data displayed from database

Data displayed from database after both filters have been activated with Boolean algebra OR condition

| Filter search criteria | | | |
|---|---|---|---|
| | 5% | | |

| Composition | Tolerance | Power rating | Resistance |
|---|---|---|---|
| Metal oxide | 5% | 1W | 1000 |
| Metal oxide | 5% | 3W | 1000 |
| Wire wound | 5% | 3W | 2200 |
| | | | |
| | | | |

AND / OR

Region for displaying filter search criteria

Data displayed from database

Data displayed from database after filter deactivated

Figure 19

METHODS AND SYSTEMS TO DISPLAY DATA RECORDS EXTRACTED FROM A DATABASE VIA A GRAPHICAL USER INTERFACE

CROSS-REFERENCE TO RELATED APPLICATION

This Application is a national stage application under 35 U.S.C. 371 and claims the benefit of PCT Application No. PCT/US2014/030405 having an international filing date of Mar. 17, 2014, which designed the United States, which PCT application claimed the benefit of priority of U.S. Provisional Application No. 61/788,182, filed on Mar. 15, 2013, the entire contents of which are incorporated herein by reference.

BACKGROUND

Field

Devices, apparatuses, systems, methods, articles of manufacture and computer readable media consistent with the present disclosure relate to graphical presentation of data records typically residing in a database and more particularly to controlling display of data based on filter parameters creating search criteria.

Description of the Related Art

Computer database information has reached a magnitude whereby index filters must be employed to narrow the field of viewable records to manageable proportions especially for human-readable form. Related art methods of managing computer database information include providing reserved fields within a graphical interface which are used to enter search parameters. Alternatively, a columned list of available filters is displayed and a filter can be selected singly or in groups from the columned list. These search parameters, commonly called 'filters' are used by the database manager to present record entries relating to the filters for viewing from the database. Multiple filters are often employed. However, a disadvantage occurs when multiple filters need to be re-specified. Often the filter list must be reset and re-entered from scratch if the filters are hierarchical. This results in a multi-stage process to change filters, slowing operational efficiency.

SUMMARY

It is an aspect to provide for the more efficient application of filter criteria to a database via a graphical user interface.

According to an aspect of an exemplary embodiment, there is provided a computer device for controlling display of database information, the computer server comprising a display that is configured to display a graphical user interface including database data arranged in a plurality of data cells; an input device that is configured to move a pointer within the graphical user interface on the display; and a processor coupled to the input device and the display, the processor being operable to execute program instructions to determine whether the pointer is positioned over a data cell of the plurality of data cells and, in response to an actuation of the input device while the pointer is determined to be over the data cell, automatically modify search criteria applied to the database data according to the data of the data cell and automatically display the database data filtered by the modified search criteria.

According to another aspect of an exemplary embodiment, there is provided a system for controlling display of database information, the system comprising a database that stores database data; a central computer server which is communicatively coupled to the database and hosts software for controlling the database, the central computer server providing remote access to the database data of the database via web applications; and a remote computer system which is communicatively coupled to the central computer server via a web browser, wherein the remote computer server comprises a display that is configured to display a graphical user interface including the database data arranged in a plurality of data cells; an input device that is configured to move a pointer within the graphical user interface on the display; and a processor coupled to the input device and the display, the processor being operable to execute program instructions to determine whether the pointer is positioned over a data cell of the plurality of data cells and, in response to an actuation of the input device while the pointer is determined to be over the data cell, automatically modify search criteria applied to the database data according to the data of the data cell, send the modified search criteria to the central computer server, receive from the central computer server the database data of the database filtered by the modified search criteria, and automatically display the received database data.

According to another aspect of an exemplary embodiment, there is provided a non-transitory computer-readable storage medium storing instructions, which, when executed by a processor of a computer, cause the computer to determine whether a pointer is positioned over a data cell of a plurality of data cells of a graphical user interface; in response to receiving an actuation signal related to the pointer while the pointer is determined to be over the data cell, automatically modify search criteria applied to database data according to the data of the data cell; and automatically output the database data filtered by the modified search criteria to the graphical user interface.

BRIEF DESCRIPTION OF THE DRAWINGS

The above and/or other aspects will become more apparent by describing in detail exemplary embodiments with reference to the attached drawings in which:

FIG. 7 illustrates the database records displayed after action of the filters selected in FIGS. 5-6, according to an exemplary embodiment;

FIG. 8 illustrates a database containing parameters relating to resistor electronic components, according to an exemplary embodiment;

FIG. 13 illustrates the database records displayed after the action of FIG. 12, according to an exemplary embodiment;

FIG. 14 illustrates changing a Boolean algebra logical condition for the search parameters, according to an exemplary embodiment;

FIG. 17 illustrates database records displayed after the action of FIG. 16, according to an exemplary embodiment;

FIG. 18 illustrates a process of deselecting a filter parameter relating to resistor electronic components, according to an exemplary embodiment;

FIG. 19 illustrates the database records displayed after the action of FIG. 18, according to an exemplary embodiment;

DETAILED DESCRIPTION

Figures 1, 2:
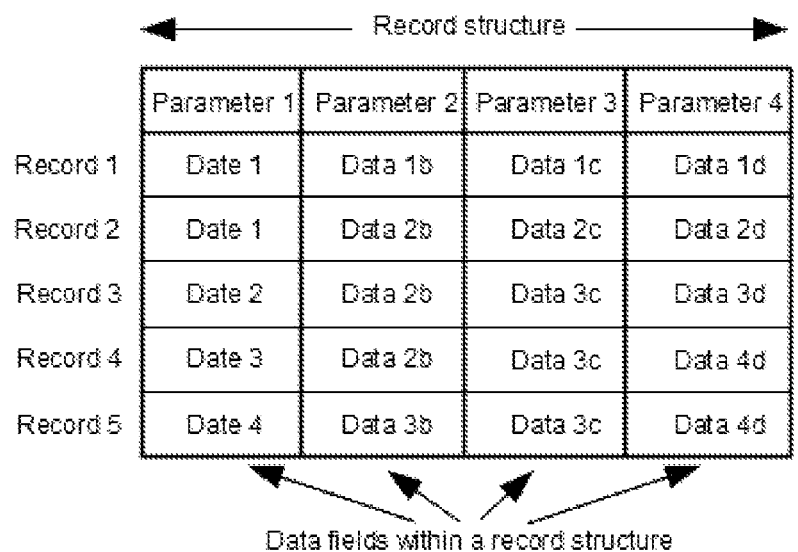
FIG. 1 illustrates a typical database record structure as stored on a computer, according to an exemplary embodiment.
FIG. 2 illustrates how a group of records may be displayed on a graphical interface, according to an exemplary embodiment.

The above and/or other aspects will now be set forth in part in the description which follows, and in part will be apparent from the description, or may be learned by practice of the inventive concept. Aspects of the inventive concept may be realized and attained by means of the elements and combinations of various elements and aspects particularly pointed out in the following detailed description and the appended claims.

It is to be understood that both the foregoing and the following descriptions are exemplary and explanatory only and are not intended to limit the appended claims or application thereof in any manner whatsoever.

In the following detailed description, reference will be made to the accompanying drawings. The aforementioned accompanying drawings show by way of illustration and not by way of limitation, specific exemplary embodiments and implementations consistent with principles of the present inventive concept. These implementations are described in sufficient detail to enable those skilled in the art to practice the inventive concept, and it is to be understood that other implementations may be utilized and that structural changes and/or substitutions of various elements may be made without departing from the scope and spirit of present inventive concept. The following detailed description is, therefore, not to be construed in a limited sense. Additionally, the various exemplary embodiments as described may be implemented in the form of software running on a general purpose computer, in the form of a specialized hardware, or combination of software and hardware.

As used in this specification and the appended claims, the singular forms "a", "an", and "the" include plural references unless the context clearly dictates otherwise. Thus, for example, references to "the method" includes one or more methods, and/or steps of the type described herein which will become apparent to those persons skilled in the art upon reading this disclosure and so forth.

The term "comprising," which is used interchangeably with "including," "containing," or "characterized by," is inclusive or open-ended language and does not exclude additional, un-recited elements or method operations. The phrase "consisting of" excludes any element, operation, or ingredient not specified in the claim. The phrase "consisting essentially of" limits the scope of a claim to the specified materials or operations and those that do not materially affect the basic and novel characteristics of the claimed inventive concept.

Unless defined otherwise, all technical and scientific terms used herein have the same meaning as commonly understood by one of ordinary skill in the art to which this inventive concept belongs.

Exemplary embodiments relate to graphical manipulation of data displayed from a computer database. A user may remotely connect to a web server application that controls the database via a computer browser to view and control the database records. The remote web browser may be installed on any computing platform such as general purpose computer and/or a mobile device, etc.

In other exemplary embodiments, the systems and methods described herein may be implemented as a web server application with remote control of the database.

Figure 22:
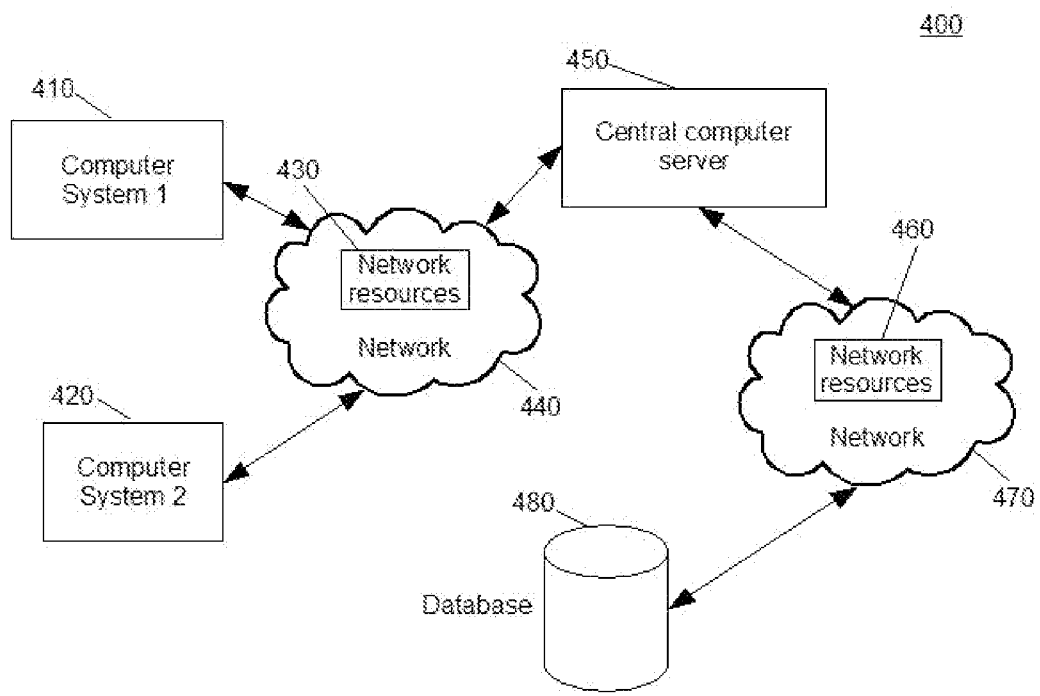
FIG. 22 is a block diagram of a computer network system, according to an exemplary embodiment.

FIG. 22 is a block diagram of a computer network system according to an exemplary embodiment. As shown in FIG. 22, a computer network system 400 includes a central computer server 450, which is communicatively coupled to a network 440, a first remote computer system 410 which is communicatively coupled to the network 440, and a second remote computer system 420 which is communicatively coupled to the network 440. The first remote computer system 410 may be a status monitoring device that runs a web-browser application. The second remote computer system 420 may be an administrator computer that runs a web browser application. The central server 450 may also host web-based applications. The central server 450 executes instructions that implement various exemplary embodiments of the inventive concept. However, alternatively, the first remote computer system 410 and/or the second remote computer system 420 may execute instructions that implement various exemplary embodiments. The central computer server 450 may be managed by a service organization, such as an administrator at a remote station 420. FIG. 22 also shows that remote status monitoring may be performed 410, by any device operating a compatible web browser and able to communicatively connect to the system network 440. The central server 450 may in turn communicatively connect to a remote database 480 via another network 470. The following descriptions are of graphical user interfaces that may be presented by a central server 450 of the computer network system 400, but may also be presented by devices 410 and 420 via web browsers and other network connectivity applications. That is, the central computer server 450 and/or the client computer devices may implement various exemplary embodiments of the inventive concept, as long as the computer server or client computer devices are capable of remote or local access to a database and are capable of displaying a graphical user interface for displaying the data of the database.

FIG. 1 illustrates a typical database record structure as stored on a computer, according to an exemplary embodiment. FIG. 2 illustrates how a group of records may be displayed on a graphical interface, according to an exemplary embodiment.

Database software creates records as exemplified in a structure illustrated by FIG. 1. As shown in FIG. 1, the record structure includes various parameters, including Parameter 1, Parameter 2, Parameter 3, and Parameter 4. The record structure also includes various records, for example, Record 1, Record 2, Record 3, Record 4, and Record 5. Each record includes data relating to each of the parameters. For example, as shown in FIG. 1, Record 1 includes Date 1 for Parameter 1, Data 1b for Parameter 2, Data 1c for Parameter 3, and Data 1d for Parameter 4. Although four parameters and five records are shown in the example of FIG. 1, the number of records and the number of parameters is not particularly limited, and thus the number of parameter may be less than or greater than four, and the number of records may be less than or greater than 5. In a typical database, there may be hundreds or thousands of record, and the number of parameters may also be quite large.

Software may display the record structure of FIG. 1 in a graphical user interface as shown in FIG. 2. As shown in FIG. 2, the data of the record may be displayed on a graphical user interface on a display of one of the devices discussed above so as to show various data associated with the various parameters. Thus, for example, as shown in FIG. 2, the graphical user interface includes data cells that show Data 1b, Data 2b, Data 2b, Data 2b, and Data 3b under the Parameter 2.

Figure 3:
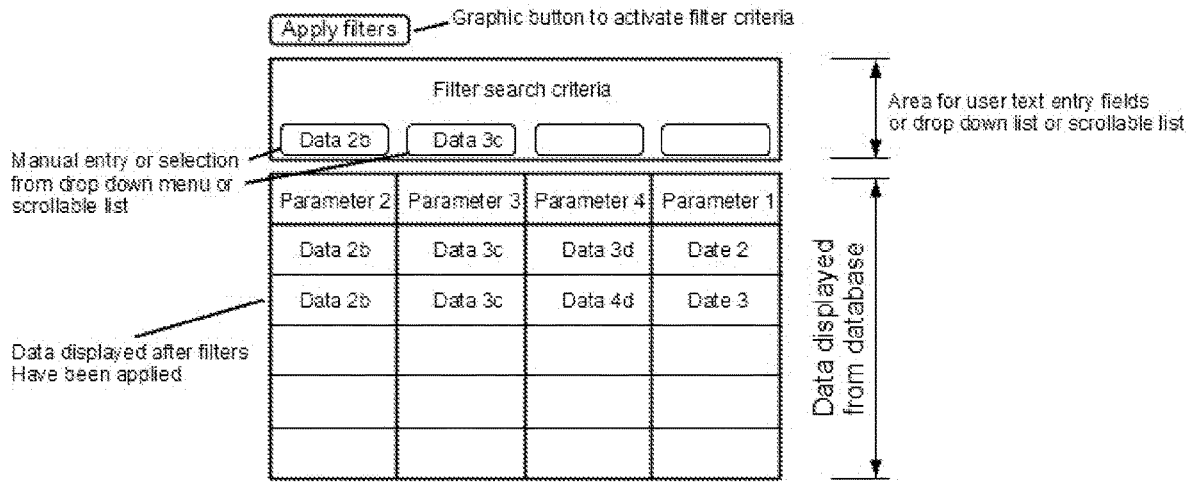
FIG. 3 illustrates a method of selecting filters to limit a range of displayed records, according to the related art.
Figure 4:
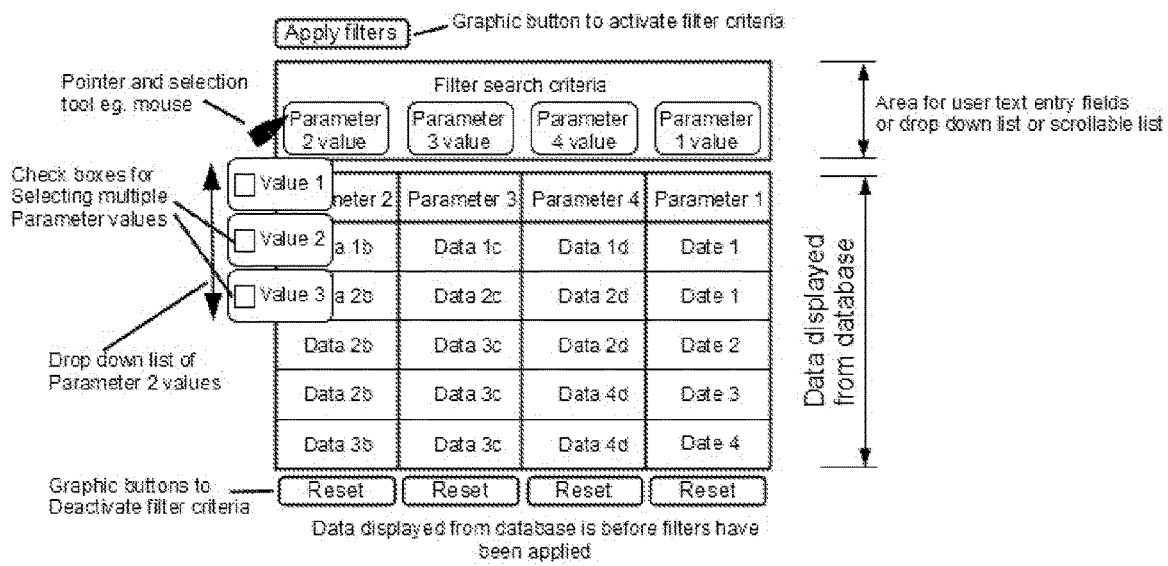
FIG. 4 illustrates using a drop-down list from a parameter heading to select values for search criteria, according to the related art.

An outline of existing methodologies for selecting filters for search criteria is depicted in FIGS. 3-4. FIG. 3 illustrates a method of selecting filters to limit a range of displayed records, according to the related art.

When multiple filters are required, a step to apply the filters must be taken, usually by an additional control, depicted by the "Apply filters" graphical button in FIG. 3. In the example of search filters shown in FIG. 3, the first search parameter becomes the value Data 2b either by selection from a drop down list, by using scrollable lists, or by typing the value into an entry field. The second search parameter in FIG. 3 is the value Data 3c selected by similar methods as the first search parameter. FIG. 3 shows data cells that are displayed from the database and graphical user interface of FIGS. 1 and 2 after the "Apply filters" graphical button has been clicked. As shown in FIG. 3, Record 3 and Record 4 which include both Data 2b and Data 3c according to the search parameters selected are displayed in the graphical user interface of FIG. 3

FIG. 4 illustrates using a drop-down list from a parameter heading to select values for search criteria, according to the related art. In this case, drop down menus are employed. When the database is large, using drop-down menus is a slow operation because scrolling through long lists will be required. FIG. 4 depicts that a drop down list has appeared for Parameter 2 after the mouse pointer has been clicked on the Parameter 2 filter search criteria button. In this example, the drop down list includes Value 1, Value 2, and Value 3, and next to each value is a check box. The user of the graphical interface has the option of selecting one or more of these values with a mouse or pointer click over the check box. Typically the check box selected will alter its graphical appearance to indicate that the check box has been selected. Check boxes for each parameter column drop down list allow a parameter to be selected from multiple parameter values for search criteria. Because manually re-locating the check boxes for parameter de-selection can be tedious, a graphical "Reset" button provided at the bottom of the Parameter 2 filter search criteria button column resets the check boxes of the drop down list to an unselected state. Thus, "Reset" buttons are provided for the respective columns. These graphical devices designed to speed up operation add to the complexity of the graphical user interface. When all filter search criteria have been selected from the drop down lists, the "Apply filters" graphical button is clicked which causes the database to return values for display, according to search filter logical rules.

By contrast, in the exemplary embodiments of the present inventive concept, when the user uses a pointing and selection device such as computer mouse and places the pointer over a data cell, referred to as a "mouse-over," a graphical icon appears to indicate that the cell contents may be added to filter search criteria which narrows the range of displayed records.

Figure 20:
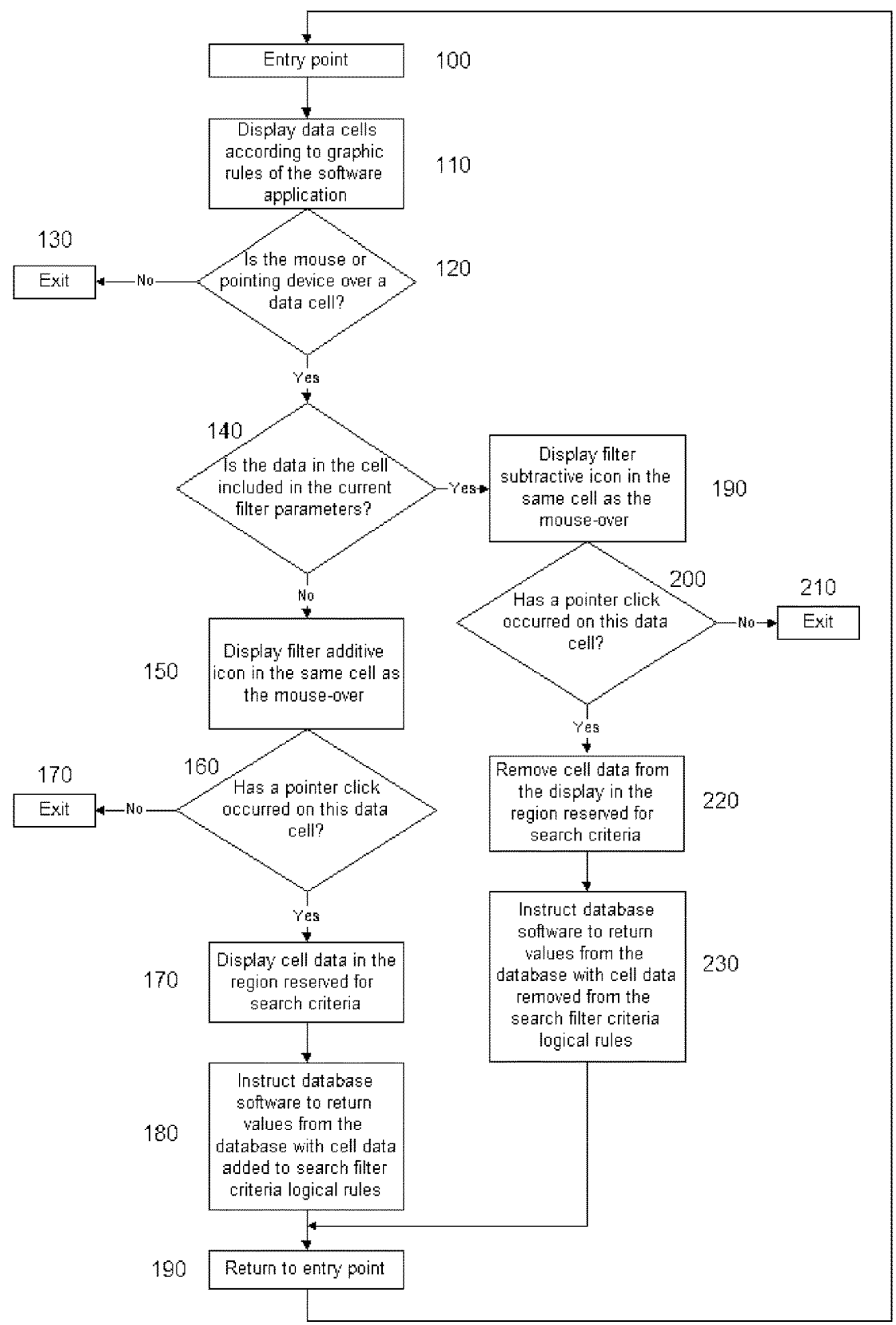
FIG. 20 illustrates an example of a flowchart showing a method of building a filter parameter, according to an exemplary embodiment.

FIG. 20 illustrates an example of a flowchart showing a method of building a filter parameter, according to an exemplary embodiment. FIG. 20 is the form of a software implementation that would be executed when the computing platform on which the graphical interface resides, detects a mouse or pointer movement. The software implementation of FIG. 20 would normally form part of a bigger software application.

As shown in FIG. 20, data cells are displayed according to the graphic rules of the software application in operation 110. That is, the graphical user interface displays the data cells of one or more records of the record structure using the graphical rules of the graphical user interface. In operation 120, it is determined whether the mouse or pointing device is over a data cell. When the mouse or pointing device is not over a data cell (operation 120, No), operation 120 is repeated. When the mouse or pointing device is determined to be over a data cell (operation 120, Yes), it is determined whether the data in the cell is included in the current filter parameters in operation 140.

When the data in the cell is not included in the current filter parameters (operation 140, No), a filter additive icon is displayed in the same cell as the mouse-over (operation 150). It is then determined whether a mouse or pointer has been actuated (e.g., the mouse or pointer has been clicked, or for example, a button of the mouse or pointer pressed) on the cell data in operation 160. When a mouse or pointer click has not occurred (operation 160, No), the process ends (operation 160). When a mouse or pointer click has occurred (operation 160, Yes), the cell data of the cell clicked is displayed in a region of the graphical user interface reserved for the display of search criteria (operation 170), and an instruction is sent to the database software to return values from the database with the cell data of the cell that is clicked added to the search filter criteria logical rules (operation 180), and the values returned form the database software are displayed by the graphical user interface and the process ends.

On the other hand, when the data in the cell included in the current filter parameters (operation 140, Yes), a subtractive icon is displayed in the same cell as the mouse-over (operation 190). It is then determined whether a mouse or pointer click has occurred on the cell data in operation 200. When a mouse or pointer click has not occurred (operation 200, No), the process ends (operation 210). When a mouse or pointer click has occurred (operation 200, Yes), the cell data of the cell clicked is removed from being displayed in the region of the graphical user interface reserved for the display of search criteria (operation 220), and an instruction is sent to the database software to return values from the database with the cell data of the cell that is clicked removed from the search filter criteria logical rules (operation 230), and the values returned form the database software are displayed by the graphical user interface and the process ends.

It should be noted that operation 170 and operation 180 of FIG. 20 may be interchanged. However it is logical to display the selected filter criteria first to give users feedback on selection as it may take some time for the software to return values from the database. Similarly, it should be noted that operation 220 and operation 230 of FIG. 20 may be interchanged. However as with operations 170 and 180, it is logical to display the selected filter criteria first to give users feedback on selection as it may take some time for the software to return values from the database.

Figure 5:
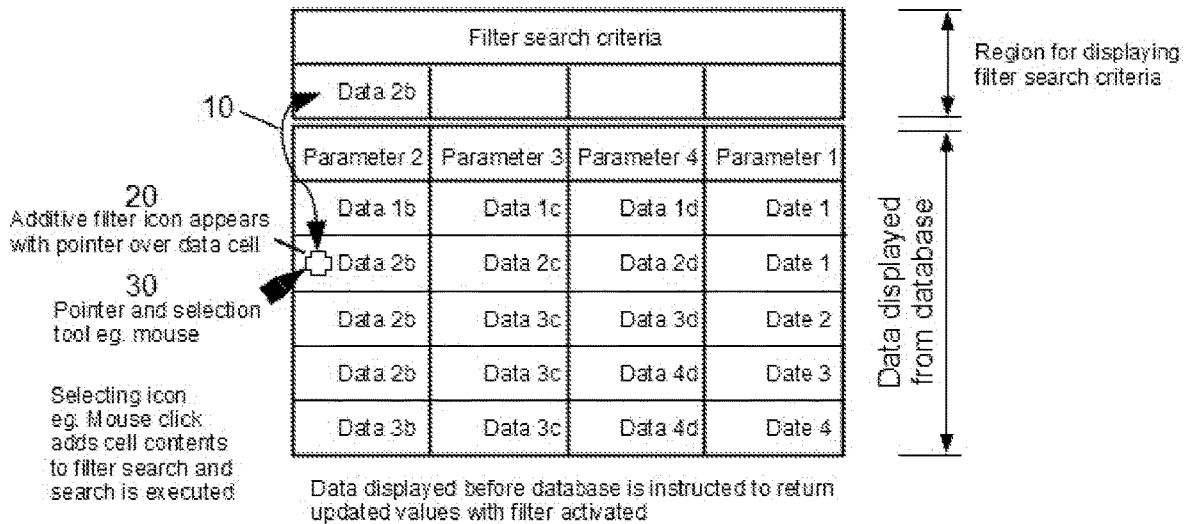
FIG. 5 illustrates a graphical device for selecting a first field within a record to become a filter parameter, according to an exemplary embodiment.

FIG. 5 illustrates a graphical user interface for selecting a first field within a record to become a filter parameter, according to an exemplary embodiment. In FIG. 5, Data 2*b* is added to the filter search criteria. A user has caused a graphical icon 20 to appear with a mouse-over 30 of a data cell with contents Data 2*b* in the Parameter 2 column. FIG. 5 also depicts that the user has clicked on the graphical icon 20 or data cell and caused the transfer of the data cell value Data 2*b* to the filter search criteria. It should be noted that the arrow 10 and associated lines indicate the execution of an instruction and are not necessarily graphical elements that are displayed in actual operation.

The graphical icon 20 of FIG. 5 may be a clickable feature. Alternatively, the graphical icon 20 may indicate that the cell becomes clickable for adding the cell contents to the filter search criteria. For example, as shown in FIG. 5, a graphic of a plus (+) is displayed over the data cell. However, this is only an example, and one or more of highlighting, outlining, bolding, or changing the characteristics of the text may alternatively be used to indicate the add feature. Upon clicking the cell, a request is immediately and automatically sent to the database software to display the relevant records that are governed by the search criteria. FIG. 5 shows the moment of filter selection, but is before the time when instructions in the software apply the filter to the displayed records. The moment of filter selection shown in FIG. 5 corresponds to operation 170 in FIG. 20 just before the software applies the filter to the displayed records.

Figure 6:
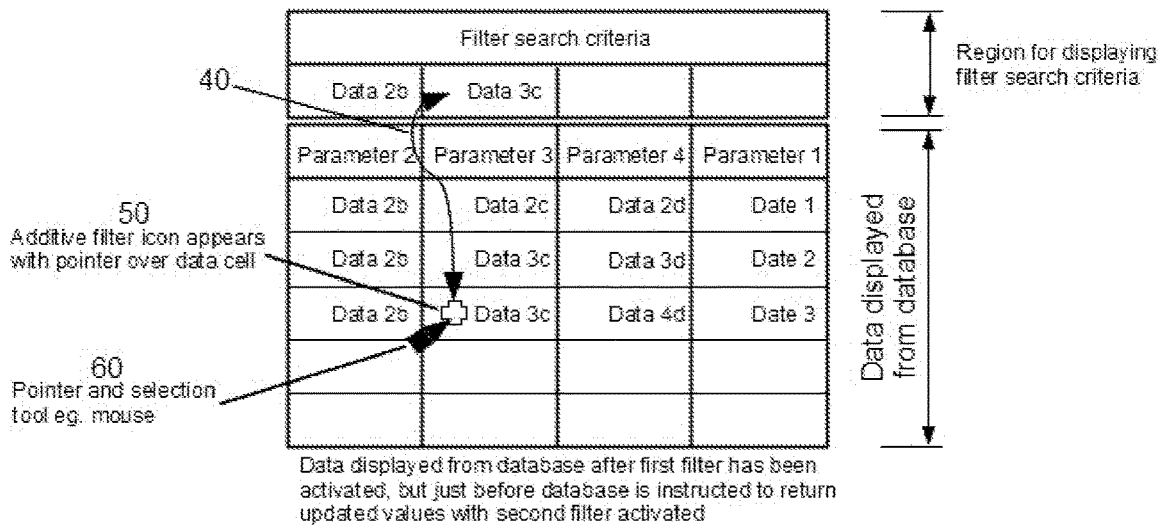
FIG. 6 illustrates the graphical device after execution of the filter parameter selected in FIG. 5, and also selecting a second field within the record to become a filter parameter, according to an exemplary embodiment.

FIG. 6 illustrates the graphical device after execution of the filter parameter selected in FIG. 5, and also selecting a second field within the record to become a filter parameter, according to an exemplary embodiment. The data cells shown in FIG. 6 show the display of data cells as the result of the execution of the search filter selected in FIG. 5. In this case all records that contain Data 2*b* are displayed. FIG. 6 thus shows the results of operation 110 following operation 180 and operation 190 of FIG. 20. FIG. 6 also shows the addition of a second data cell to the filter search criteria. FIG. 6 also depicts that the user has clicked the pointer 60 on the graphical icon 50 or data cell and caused the transfer of the data cell value Data 3*c* to the filter search criteria. It should be noted that the arrow 40 and associated lines indicate the execution of an instruction and are not necessarily graphical elements that are displayed in actual operation. As with FIG. 5, FIG. 6 shows the moment of the second filter selection, but before the time when instructions in the software apply the second filter to the displayed records. A mouse-over over any data cell that contains valid data, i.e. is not blank, produces an icon which is clickable or indicates that the data cell in which the icon appears is clickable for altering the search criteria.

FIG. 7 illustrates the database records displayed after action of the filters selected in FIGS. 5-6, according to an exemplary embodiment. FIG. 7 shows the results of the two filters depicted in FIGS. 5-6 for the search criteria according to a default Boolean algebra logical AND condition for the filter parameters. In the case of FIG. 7 records that contain Data 2*b* and also include Data 3*c* are displayed. Thus, FIG. 7 shows the graphical user interface after operation 110 following operations 180 and 190 in FIG. 20.

In the above manner and as depicted in the flowchart of FIG. 20, data cell information can be added to the filter search criteria in any order. Moreover, in response to a mouse-over and mouse click, the displayed data is automatically updated without having to further click an "Apply filter" button as the in the related art. Additionally, deleting search criteria may be more easily accomplished by a click of a mouse rather than having to click a "reset" button to clear the whole search criteria and start over from scratch.

Figure 9:
FIG. 9 illustrates a graphical device for selecting a field within a record to become a filter parameter within the database of FIG. 8, according to an exemplary embodiment.
Figure 10:
FIG. 10 illustrates an action of adding a search parameter, according to an exemplary embodiment.
Figure 11:
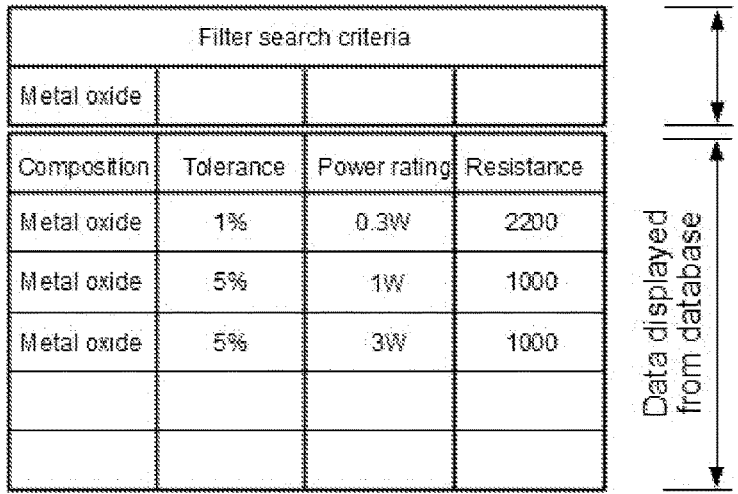
FIG. 11 illustrates database records displayed after the action selected in FIG. 10, according to an exemplary embodiment.

FIG. 8 illustrates a database containing parameters relating to resistor electronic components, according to an exemplary embodiment. FIG. 9 illustrates a graphical device for selecting a field within a record to become a filter parameter within the database of FIG. 8, according to an exemplary embodiment. FIG. 10 illustrates an action of adding a search parameter, according to an exemplary embodiment. FIG. 11 illustrates database records displayed after the action selected in FIG. 10, according to an exemplary embodiment.

FIG. 8 illustrates a practical example of a database using the parameters of resistor electronic components. In this example the values displayed in the columns from left to right are: Resistance values in ohms, material of construction, accuracy of marked value as a percentage deviance and power dissipation in watts.

FIG. 9 shows that a clickable icon 70 appears when a mouse-over 80 of the data cell "metal oxide" occurs. This corresponds to operation 150 in FIG. 20. The icon 70 may indicate that either the icon 70 or the cell in which the icon 70 appears is clickable for adding this cell value to the search parameters. As discussed above, although a graphic of a plus (+) is displayed over the data cell, this is only an example, and one or more of highlighting, outlining, bolding, or changing the characteristics of the text may alternatively be used to indicate the add feature.

FIG. 10 references operation 170 in FIG. 20, where a mouse click 95 on a data cell has added "metal oxide" to filter search criteria, after a mouse-over action has caused the graphical icon 90 for adding the cell to search criteria 85 to appear.

FIG. 11 shows operation 110 in FIG. 20 following operation 180 and operation 190 where values from the database have been displayed according to the search criteria established in FIG. 10. In this case records containing "metal oxide" are displayed.

Figure 12:
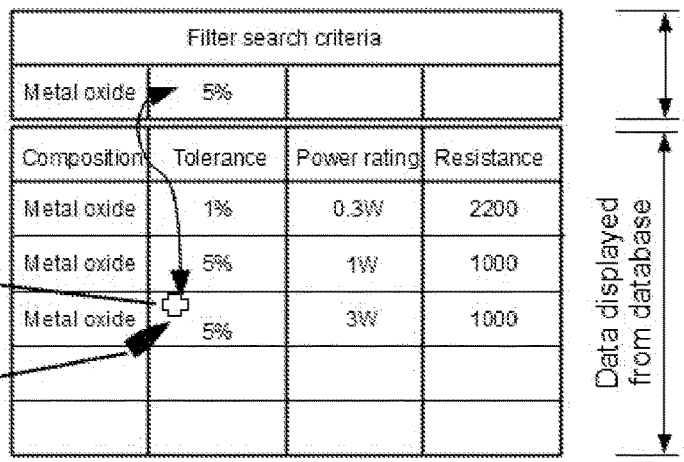
FIG. 12 illustrates a graphical device for selecting a second field within a record to become a filter parameter, according to an exemplary embodiment.

FIG. 12 illustrates a graphical device for selecting a second field within a record to become a filter parameter, according to an exemplary embodiment. FIG. 13 illustrates the database records displayed after the action of FIG. 12, according to an exemplary embodiment.

FIG. 12 shows how a second parameter is added to search criteria indicating operation 170 in FIG. 20. In FIG. 12 the tolerance value 5% is added to the search criteria following a mouse-over and click on the bottom cell of the Tolerance column.

FIG. 13 shows the results of the two filters established in FIGS. 10 and 12. Thus displayed data meets the Boolean algebra logical AND condition where both parameters must be present in the displayed records.

FIG. 14 illustrates changing a Boolean algebra logical condition for the search parameters, according to an exemplary embodiment. FIG. 14 shows an extension of selectable Boolean algebra where additional graphical buttons allow an OR condition to be met for displaying records according to the search parameters. Here, the graphical user interface is modified to include an "AND" button and an "OR" button for selecting between an "AND" mode and an "OR" mode. The hatched OR button in FIG. 14 indicates that the OR button has been selected to enter the OR mode which results in an additional record of the wire wound resistor being displayed. That is, upon clicking the OR button, the search criteria is automatically changed to use the OR operation and the search criteria is automatically applied to display data according to the search criteria applied according to the OR mode. Thus, as shown in FIG. 14, the displayed records are metal oxide composition OR 5% tolerance.

Figure 15:
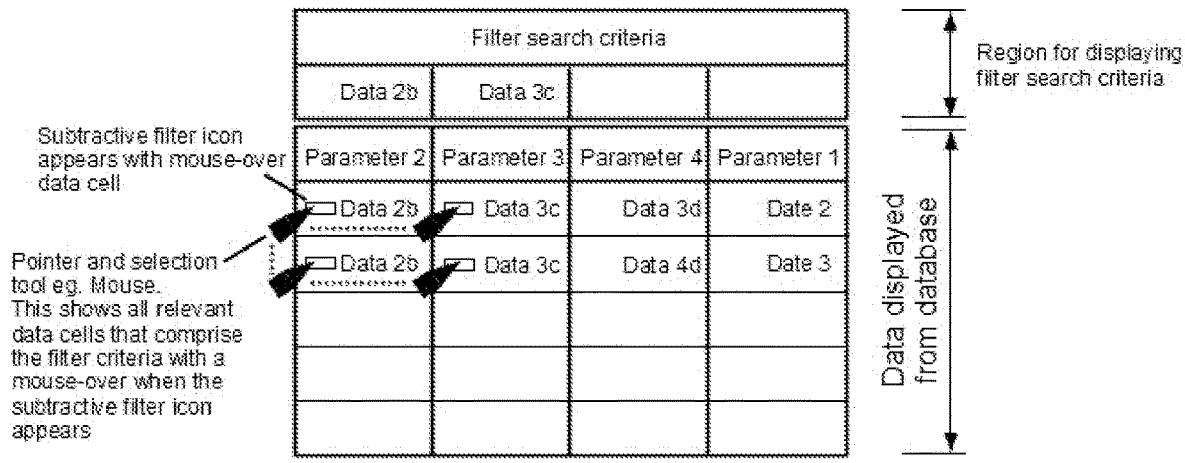
FIG. 15 illustrates a process of performing a mouse-over of data cells to add a graphical icon indicating data that can be removed from search criteria; according to an exemplary embodiment.

FIG. 15 illustrates a process of performing a mouse-over of data cells to add a graphical icon indicating data that can be removed from search criteria; according to an exemplary embodiment. When a data cell is part of the filter search criteria, a mouse-over the data cell initiates appearance of a graphical icon to indicate that the data cell may be removed from the filter search criteria as depicted in FIG. 15. FIG. 15 illustrates that four possible data cells are part of the search criteria. In this manner, after filter activation, any displayed data cell that contains a search criteria element can be used to remove the criteria of the data cell from the search parameters.

Figure 16:
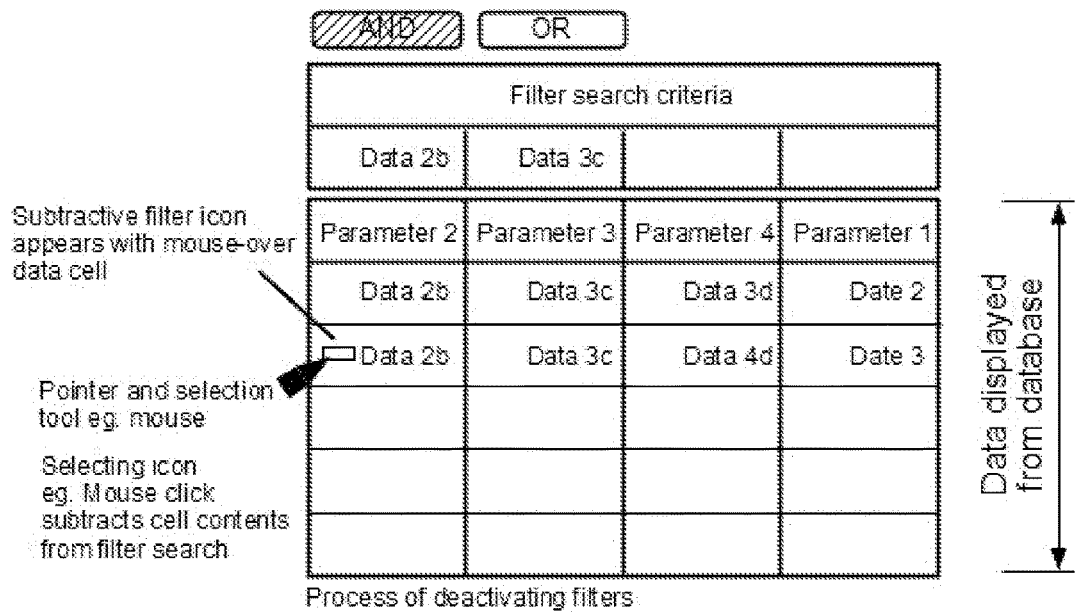
FIG. 16 illustrates a process of deselecting a filter parameter within a list of displayed records, according to an exemplary embodiment.

FIG. 16 illustrates a process of deselecting a filter parameter within a list of displayed records, according to an exemplary embodiment. In FIG. 16 a mouse-over a data cell that qualifies as search criteria results in the display of a graphical icon, corresponding to operation 190 in FIG. 20. FIG. 16 shows records displayed according to a Boolean algebra logical AND condition. The hatched AND graphical button of FIG. 16 indicates that the AND logical condition for search parameters is selected. The graphical icon of FIG. 16 may be a clickable feature. Alternatively, the graphical icon may indicate that the data cell is clickable which subtracts the cell contents from the filter search criteria when clicked and immediately requests the database software to retrieve the relevant records that are governed by the search criteria. That is, upon clicking the graphical icon or clicking the data cell, the cell contents are removed from the filter search criteria and a request is automatically sent to the database software to retrieve and display the relevant records according to the updated search criteria.

Figures 17, 18:
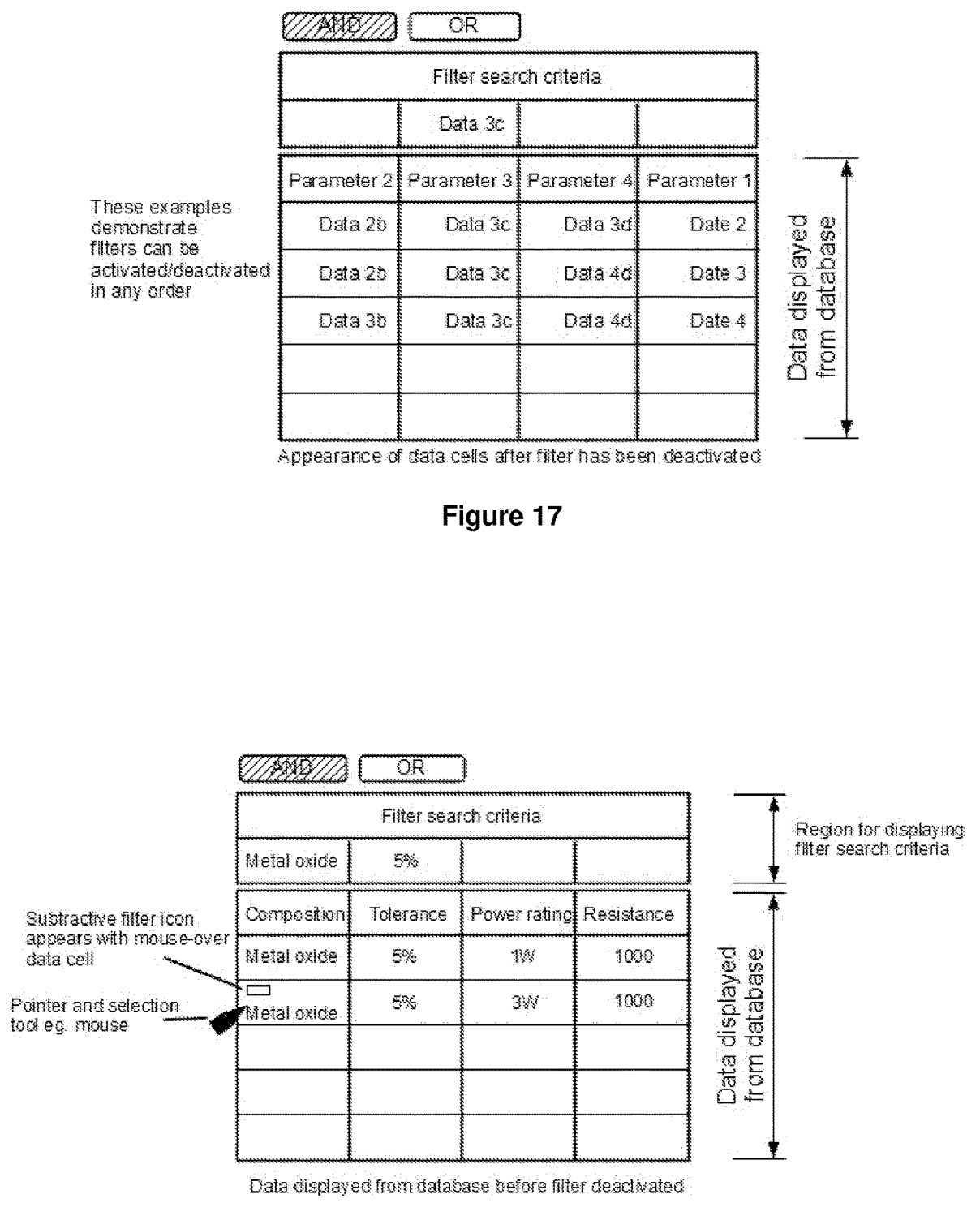

FIG. 17 illustrates database records displayed after the action of FIG. 16, according to an exemplary embodiment. In FIG. 17, Data 2*b* is removed from the search criteria and after clicking the graphical icon or the data cell as shown in FIG. 16. Thus FIG. 17 shows the graphical user interface display after execution of operations 190 and 230. In FIG. 17 a single search criteria remains and records containing the value Data 3*c* are displayed.

In the above manner data cell information can be removed from the filter search criteria in any order and any new mouse-over of a removed data cell will subsequently produce an additive filter icon for cells that have been removed from the search criteria. Thus, the data cells alternate between additive and subtractive states.

FIG. 18 illustrates a process of deselecting a filter parameter relating to resistor electronic components, according to an exemplary embodiment. FIG. 19 illustrates the database records displayed after the action of FIG. 18, according to an exemplary embodiment.

FIG. 18 illustrates a practical example using resistor parameters for deselecting a search filter. In FIG. 18 a mouse-over a data cell cause a subtractive graphical icon to appear, operation 190 in FIG. 20. The example shown in FIG. 18 is with filter parameters in the Boolean algebra logical AND condition as depicted by the hatched graphical AND button.

FIG. 19 illustrates values displayed from the database after the cell with the subtractive icon has been clicked following operations 190 and 230. In this case the value of "metal oxide" has been removed as a search parameter, and the value of 5% is the sole search parameter and records containing the value 5% are displayed.

Figure 21:
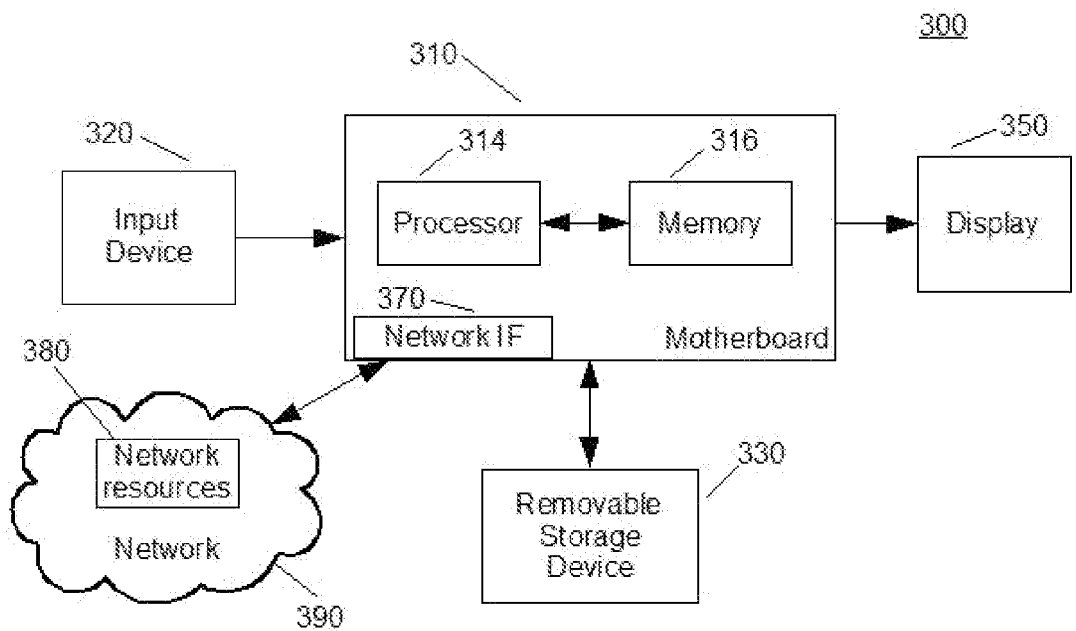
FIG. 21 is a block diagram of a computer system, according to an exemplary embodiment.

FIG. 21 is a block diagram of a computer device, according to an exemplary embodiment. FIG. 21 is a block diagram that illustrates a computer device 300 upon which an exemplary embodiment may be implemented. The computer device 300 represents a configuration of any of the central computer server 450, the first remote computer system 410 and the second remote computer system 420. The computer device 300 includes a computer/server platform 310 including a processor 314 and memory 316 which operate to execute instructions. For example, the processor 314 may be a microcontroller or a microprocessor. Additionally, the computer platform 310 may receive input from a plurality of input devices 320, such as a keyboard, mouse, touch device or verbal command. The computer platform 310 may additionally be connected to a removable storage device 330, such as a portable hard drive, optical media (CD or DVD), disk media or any other tangible medium from which a computer can read executable code. The computer platform may further include a network interface (I/F) 370 for communicatively coupling to a network 390. The computer platform 310 may be communicatively coupled to network resources 380 which connect to the Internet or other components of a local network such as a LAN or WLAN. The local network may be a public or private network. The network resources 380 may provide instructions and data to the computer platform from a remote location on a network 390. The connections to the network resources 380 may be accomplished via wireless protocols, such as the 802.11 standards, BLUETOOTH® or cellular protocols, or via physical transmission media, such as cables or fiber optics. The network resources 380 may include storage devices for storing data and executable instructions at a location separate from the computer platform 310. The computer interacts with a display 350 to output a graphical user interface including data and other information to a user, as well as to request additional instructions and input from the user. The display 350 may therefore further act as an input device 320 for interacting with a user.

The term "computer-readable storage medium" as used herein refers to any tangible medium, such as a disk or semiconductor memory, that participates in providing instructions to processor 314 for execution. For example, the computer-readable storage medium may be a removable disk readable by the removable storage device, or the memory 316, or a storage device located on a device on the network 390, each of which being accessible by the processor 314 of the computer server system 300.

Exemplary embodiments provide for the more efficient application of filter criteria to a database via a graphical user interface. The records displayed from the database become the entry mechanism for filter criteria with individual fields within a record available as filters.

The foregoing exemplary embodiments and advantages are merely exemplary and are not to be construed as limiting the inventive concept. The present inventive concept can be readily applied to other types of apparatuses. Also, the description of the exemplary embodiments is intended to be illustrative, and not to limit the scope of the claims, and many alternatives, modifications, and variations will be apparent to those skilled in the art. Although the inventive concept has been described with reference to certain exemplary embodiments, it will be understood that modifications and variations may be made thereto without departing from the spirit and scope of the inventive concept, as defined by the following claims.

What is claimed is:

1. A computer device for controlling display of database information, the computer device comprising:
    a display that is configured to display a graphical user interface including database data arranged in a plurality of data cells;
    an input device that is configured to move a pointer within the graphical user interface on the display; and
    a processor coupled to the input device and the display, the processor being operable to execute program instructions to determine whether the pointer is positioned over a data cell of the plurality of data cells and, in response to an actuation of the input device while the pointer is determined to be over the data cell, automatically modify search criteria applied to the database data according to the data of the data cell and automatically display the database data filtered by the modified search criteria, and when the data of the data cell is included in current filter parameters and that data cell is actuated by the input device, the data of that data cell is removed from the search filter,
    wherein the processor, in response to the determination that the pointer is positioned over the data cell, determines whether the data of the data cell is already included in the search criteria, and when the data is already included in the search criteria, controls the display to display an indication that the data is already included in the search criteria, and when the data is not already included in the search criteria, controls the display to display an indication is not already included in the search criteria, wherein the indication is an icon that is specific to the data cell and displayed within the data cell.

2. The computer device of claim 1, wherein the processor modifies the search criteria by adding the data of the data cell to the search criteria, or by subtracting the data of the data cell from the search criteria.

3. The computer device of claim 1, wherein the indication that the data is already included in the search criteria is a subtraction icon displayed over the data cell, and the indication that the data is not already included in the search criteria is an addition icon displayed over the data cell.

4. The computer device of claim 1, wherein the indication that the data is already included in the search criteria is a first modification of the data cell, and the indication that the data is not already included in the search criteria is a second modification of the data cell, the second modification being different than the first modification.

5. The computer device of claim 4, wherein the first modification and the second modification each comprises one or more of highlighting, outlining, balding, or changing the characteristics of the text of the data in the data cell.

6. The computer device of claim 4, wherein the first modification and the second modification each comprises one or more of highlighting, outlining, balding, or changing the characteristics of the data cell that contains the data.

7. The computer device of claim 1, wherein after modifying the search criteria, the processor sends the modified search criteria to an external database that is communicatively coupled to the computer device via a network, and receives the database data filtered by the sent search criteria from the external database.

8. A system for controlling display of database information, the system comprising:
    a database that stores database data;
    a central computer server which is communicatively coupled to the database and hosts software for controlling the database, the central computer server providing remote access to the database data of the database via web applications; and
    a remote computer system which is communicatively coupled to the central computer server via a web browser,
    wherein the remote computer system comprises:
        a display that is configured to display a graphical user interface including the database data arranged in a plurality of data cells;
        an input device that is configured to move a pointer within the graphical user interface on the display; and
        a processor coupled to the input device and the display, the processor being operable to execute program instructions to determine whether the pointer is positioned over a data cell of the plurality of data cells and, in response to an actuation of the input device while the pointer is determined to be over the data cell, automatically modify search criteria applied to the database data according to the data of the data cell, send the modified search criteria to the central computer server, receive from the central computer server the database data of the database filtered by the modified search criteria, and automatically display the received database data, and when the data of the data cell is included in current filter parameters and that data cell is actuated by the input device, the data of that data cell is removed from the search filter,
    wherein the processor, in response to the determination that the pointer is positioned over the data cell, determines whether the data of the data cell is already included in the search criteria, and when the data is already included in the search criteria, controls the display to display an indication that the data is already included in the search criteria, and when the data is not already included in the search criteria, controls the display to display an indication is not already included in the search criteria, wherein the indication is an icon that is specific to the data cell and displayed within the data cell.

9. The system of claim 8, wherein the central computer server is communicatively coupled to the database via a first network, and the central computer server is communicatively coupled to the remote computer system via a second network different from the first network.

10. The system of claim 8, wherein the processor modifies the search criteria by adding the data of the data cell to the search criteria, or by subtracting the data of the data cell from the search criteria.

11. The system of claim 8, wherein the indication that the data is already included in the search criteria is a subtraction icon displayed over the data cell, and the indication that the data is not already included in the search criteria is an addition icon displayed over the data cell.

12. The system of claim 8, wherein the indication that the data is already included in the search criteria is a first modification of the data cell, and the indication that the data is not already included in the search criteria is a second modification of the data cell, the second modification being different than the first modification.

13. The system of claim 12, wherein the first modification and the second modification each comprises one or more of highlighting, outlining, balding, or changing the characteristics of the text of the data in the data cell.

14. The system of claim 12, wherein the first modification and the second modification each comprises one or more of highlighting, outlining, balding, or changing the characteristics of the data cell that contains the data.

15. A non-transitory computer-readable storage medium storing instructions, which, when executed by a processor of a computer, cause the computer to:
   determine whether a pointer is positioned over a data cell of a plurality of data cells of a graphical user interface;
   in response to receiving an actuation signal related to the pointer while the pointer is determined to be over the data cell, automatically modify search criteria applied to database data according to the data of the data cell; and
   automatically output the database data filtered by the modified search criteria to the graphical user interface, and when the data of the data cell is included in current filter parameters and that data cell is actuated by the input device, the data of that data cell is removed from the search filter,
   wherein in response to the determination that the pointer is positioned over the data cell, the computer executes instructions to cause the computer to determine whether the data of the data cell is already included in the search criteria, and when the data is already included in the search criteria, output an indication that the data is already included in the search criteria to the graphical computer interface, and when the data is not already included in the search criteria, output an indication is not already included in the search criteria to the graphical user interface, wherein the indication is an icon that is specific to the data cell and displayed within the data cell.

16. The computer readable medium of claim 15, wherein the search criteria is modified by adding the data of the data cell to the search criteria, or by subtracting the data of the data cell from the search criteria.

17. The computer readable medium of claim 15, wherein the indication that the data is already included in the search criteria is a subtraction icon, and the indication that the data is not already included in the search criteria is an addition icon.

* * * * *